United States Patent
Wang et al.

(10) Patent No.: US 11,773,953 B2
(45) Date of Patent: Oct. 3, 2023

(54) TORQUE CONVERTER AND VEHICLE INCLUDING THE TORQUE CONVERTER

(71) Applicant: VALEO KAPEC TORQUE CONVERTERS (NANJING) CO., LTD., Nanjing (CN)

(72) Inventors: Shengzhang Wang, Nanjing (CN); Xun Hu, Nanjing (CN); Ronglin Bi, Nanjing (CN); Yanxia Sun, Nanjing (CN)

(73) Assignee: VALEO KAPEC TORQUE CONVERTERS (NANJING) CO., LTD., Nanjing (CN)

( * ) Notice: Subject to any disclaimer, the term of this patent is extended or adjusted under 35 U.S.C. 154(b) by 11 days.

(21) Appl. No.: 17/633,872

(22) PCT Filed: Aug. 7, 2020

(86) PCT No.: PCT/CN2020/107871
§ 371 (c)(1),
(2) Date: Feb. 8, 2022

(87) PCT Pub. No.: WO2021/027734
PCT Pub. Date: Feb. 18, 2021

(65) Prior Publication Data
US 2022/0325785 A1    Oct. 13, 2022

(30) Foreign Application Priority Data
Aug. 9, 2019    (CN) .......................... 201910734377.2

(51) Int. Cl.
F16H 45/02        (2006.01)
(52) U.S. Cl.
CPC ..... F16H 45/02 (2013.01); *F16H 2045/0263* (2013.01)

(58) Field of Classification Search
CPC .. F16D 33/18; F16H 45/02; F16H 2045/0263; F16H 2045/0278; F16H 41/24
See application file for complete search history.

(56) References Cited

U.S. PATENT DOCUMENTS

| | | | |
|---|---|---|---|
| 4,872,810 A | 10/1989 | Brown et al. | |
| 5,246,399 A | 9/1993 | Yanko et al. | |
| (Continued) | | | |

FOREIGN PATENT DOCUMENTS

| | | |
|---|---|---|
| CN | 1043540 A | 7/1990 |
| CN | 103994200 A | 8/2014 |
| (Continued) | | |

OTHER PUBLICATIONS

International Search Report dated Nov. 2, 2020 in PCT/CN2020/107871 filed Aug. 7, 2020, citing documents AA-AD and AO-AT therein, 2 pages.

*Primary Examiner* — Huan Le
(74) *Attorney, Agent, or Firm* — Oblon, McClelland, Maier & Neustadt, L.L.P.

(57) ABSTRACT

A torque converter includes a pump shell having pump blades; a turbine shell having a support portion supporting turbine blades, wherein the turbine blades are driven by the pump blades via a fluid to rotate about a rotational axis. The turbine shell further has a flange portion extending outward at the radially outside of the support portion and is integrally formed with the support portion. The torque converter further comprises a vibration damping device, the mass of which is mounted on the flange portion and configured to be movable relative to the flange portion and apply a torque to the turbine shell, thereby damping the torque vibration on the turbine shell. In addition, the invention also discloses a vehicle comprising the torque converter.

20 Claims, 6 Drawing Sheets

(56) References Cited

U.S. PATENT DOCUMENTS

| | | | |
|---|---|---|---|
| 10,180,176 B2 | 1/2019 | Dinger et al. | |
| 10,288,158 B2 * | 5/2019 | Saka | ................... F16H 41/24 |
| 2016/0178030 A1 | 6/2016 | Dinger et al. | |

FOREIGN PATENT DOCUMENTS

| | | |
|---|---|---|
| CN | 105408663 A | 3/2016 |
| CN | 205936703 U | 2/2017 |
| CN | 107850180 A | 3/2018 |
| CN | 211059318 U | 7/2020 |
| JP | 2015-509579 A | 3/2015 |
| JP | 2015-083847 A | 4/2015 |
| JP | 2017-015210 A | 1/2017 |
| JP | 2017-125611 A | 7/2017 |
| WO | WO 2015/151654 A1 | 10/2015 |

* cited by examiner

TORQUE CONVERTER AND VEHICLE INCLUDING THE TORQUE CONVERTER

TECHNICAL FIELD

The present application relates to a torque converter, in particular to a torque converter integrating a vibration damping device on the turbine shell. The present application relates to a vehicle including the torque converter.

BACKGROUND

In the vehicle transmission system, a torque converter is installed between the internal combustion engine and the transmission, using fluid as the working medium to transmit torque, change torque and clutch. The torque converter may include a vibration damping device (for example, centrifugal pendulum) for eliminating torsional vibration inherent in the output of the internal combustion engine.

There has been a need to reduce the torsional vibration by improving the structure of torque converter.

However, most of the vibration damping devices in the prior art are independent devices separated from the turbine shell and other components of the torque converter. Installing a separate vibration damping device on the turbine shell requires additional parts and complicated processes such as welding. In addition, the vibration damping devices in the prior art usually occupy a large axial distance, taking up the axial space of the torque converter, which is not conducive to forming a compact torque converter.

Therefore, it is desired to provide a torque converter with an improved structure to at least overcome many problems existing in the prior art.

SUMMARY

The purpose of the present invention is to reduce or eliminate the torsional vibration transmitted through the torque converter.

In one aspect of the present invention, a torque converter is provided, which comprises a pump shell having pump blades; a turbine shell having a support portion supporting turbine blades, wherein the turbine blades are driven by the pump blades via a fluid to rotate about a rotational axis. The turbine shell further has a flange portion, the flange portion extends outward at the radially outside of the support portion and is integrally formed with the support portion. The torque converter further includes a vibration damping device, the mass of which is mounted on the flange portion and configured to be able to move relative to the flange portion and apply a torque to the turbine shell. According to this technical solution, if there is a torque fluctuation on the turbine shell, the mass of the vibration damping device will swing relative to the turbine shell under the effect of inertia and apply a torque in the opposite direction onto the turbine shell, thereby achieving the vibration damping effect. In addition, the mass of the vibration damping device is directly installed on the turbine shell, and no other parts are needed, so that convenient and simple installation can be realized.

In some embodiments, the flange portion and the support portion are integrally formed by stamping. According to this technical solution, the flange portion and the support portion are integrally stamped and formed using the same metal plate, so that the connection strength between the flange portion and the support portion is high, and accurate positioning of the flange portion and the mass thereon is easy to realize.

In some embodiments, the flange portion extends outward from the radial outer edge of the support portion.

In some embodiments, the support portion is provided with a folded portion at the radial outer edge thereof, and the folded portion overlaps axially with a portion of the support portion; and, the proximal end of the folded portion is connected to the radial outer edge of the support portion, and the distal end of the folded portion is connected to the radial inner edge of the flange portion. According to this technical solution, the flange portion is offset away from the pump shell by a certain distance in the axial direction, allowing the mass to be arranged further away from the pump shell, so that the axial size of the torque converter can be reduced.

In some embodiments, the flange portion extends in a plane perpendicular to the axial direction.

In some embodiments, the flange portion is inclined at an angle with respect to a plane perpendicular to the axial direction. Advantageously, the flange portion is inclined in a direction away from the pump shell. According to this technical solution, the flange portion deflects away from the pump shell for a certain distance in the axial direction, allowing the mass to be arranged further away from the pump shell, so that the axial size of the torque converter can be reduced.

In some embodiments, the torque converter includes two masses located on either side of the flange portion; wherein, the two masses are fixedly coupled with each other by a connecting member, and the connecting member passes through the through hole in the flange portion and is movable along the through hole.

In some embodiments, the connecting member may be a boat-shaped spacer, which is in interference fit with openings in the two masses. The spacer defines a first track, the through hole defines a second track radially facing the first track, and a roller is disposed between the first track and the second track. The roller is configured to be able to roll along the first track and the second track simultaneously, and the two masses are able to apply the torque onto the turbine shell via the roller.

In some embodiments, each mass has an outer waist-shaped hole, the flange portion has an inner waist-shaped hole, the outer waist-shaped holes and the inner waist-shaped hole being oriented in opposite radial directions, and the roller passing through the outer waist-shaped holes and the inner waist-shaped hole of the two masses in the axial direction. The roller is configured to be able to roll along the outer waist-shaped holes and the inner waist-shaped hole simultaneously, and the two masses are capable of applying a torque onto the turbine shell via the roller.

In some embodiments, each mass has an outer spring groove, the flange portion has an inner spring groove, the outer spring grooves and the inner spring groove having the same circumferential lengths, and a spring member is disposed in the outer spring grooves and the inner spring groove. The spring member is configured to be able to contact only the outer spring grooves at one end thereof and contact only the inner spring groove at the opposite end thereof, so as to realize compressive deformation, and the two masses are capable of applying the torque onto the turbine shell via the spring member.

In another aspect of the present invention, a vehicle is provided, which includes any one of the torque converters described above.

DETAILED DESCRIPTION OF THE EMBODIMENTS

Figure 1:
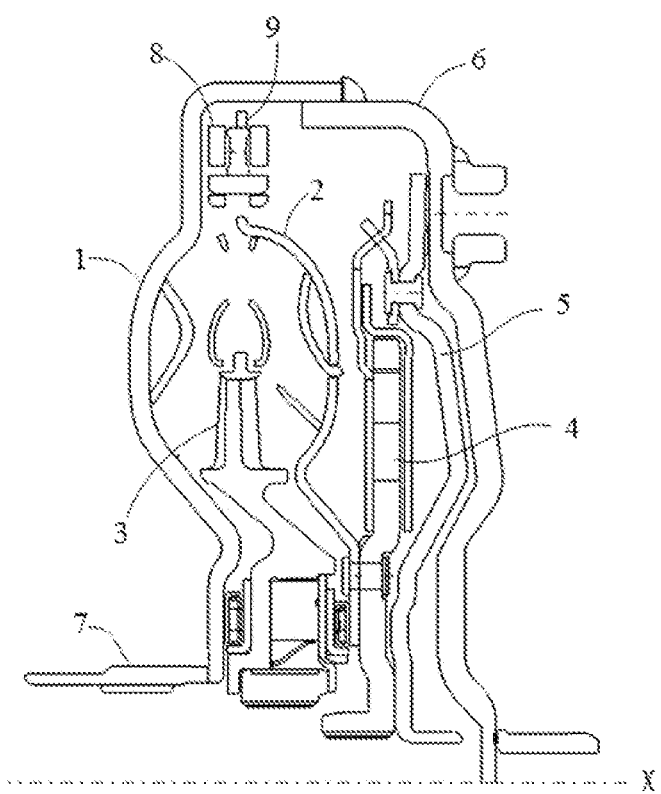
FIG. 1 is a general side view of a torque converter according to the present invention.

The specific embodiments of the present invention will be described in detail below with reference to the accompanying drawings. Components with the same and similar reference numerals in the drawings have the same or similar functions.

In the following description, "axial direction" refers to the direction parallel to the rotational axis X of the torque converter; "circumferential direction" refers to the direction around the rotational axis X; "radial direction" refers to the direction perpendicular to the rotational axis X, wherein "outward", "outside" and so on refer to the direction radially outward away from the rotational axis X, and "inward" and "inside" refer to the direction radially inward towards the rotational axis X.

FIG. 1 is a general side view of a torque converter according to the present invention. As shown in FIG. 1, the torque converter includes a pump shell 1, a turbine shell 2, a guide wheel 3, a spring damper 4, a locking clutch 5 and a rear shell 6. At the input side of the torque converter, the output shaft of the upstream internal combustion engine drives the pump shell 1 to rotate via a pump shell hub 7. Since the pump shell 1 and the housing 6 are welded together, they can rotate together. At the output side of the torque converter, the turbine shell 2 and the spring damper 4 are riveted together, and the spring damper 4 is connected to the output shaft of the torque converter via splines located at the hub in order to output a torque to the downstream transmission. The pump shell 1 and the turbine shell 2 face each other and define a fluid chamber. The pump shell 1 has pump blades, and the turbine shell 2 has turbine blades. The pump blades can drive the turbine blades to rotate via a fluid in the fluid chamber, and then drive the turbine shell 2 to rotate.

When the locking clutch 5 is actuated to open, the power transmission between the housing 6 and the spring damper 4 is disconnected. At this time, the pump shell 1 drives the turbine shell 2 to rotate only via the fluid, and the turbine shell 2 drives the output shaft to rotate. This is advantageous when the automobile starts, and it is able to effectively increase the torque.

When the locking clutch 5 is actuated to close, the power transmission between the housing 6 and the spring damper 4 is connected. At this time, the torque of the pump shell 1 is transmitted to the output shaft sequentially through the rear housing 6, the locking clutch 5 and the spring damper 4, and the spring damper 4 drives the turbine shell 2 to rotate together. In this case, the torque fluctuation of the internal combustion engine will be transmitted to the downstream transmission. Although the spring damper 4 can partially absorb this torque fluctuation, there are still problems in vibration, noise and fuel consumption.

In view of this, the present invention proposes that an extended annular flange portion 9 is formed on the radially outside of the turbine shell 2, and a vibration damping device 8 (for example, a centrifugal pendulum or a dynamic vibration absorber) is installed on the flange portion 9, so as to realize the integration of the vibration damping device 8 and the turbine shell 2.

In this case, when the locking clutch 5 is closed, the vibration damping device 8 integrated onto the turbine shell 2 is used for further damping on the basis of the damping by the spring damper 4, making it possible to lock up at a low speed and meanwhile improving the fuel economy and the comfort of the whole vehicle.

In addition, the vibration damping device 8 is integrated with the turbine shell 2, which reduces the number of parts and improves the convenience of installation operation and the reliability of overall performance.

Furthermore, the vibration damping device 8 is disposed on the radially outside of the turbine shell 2, and it does not occupy additional axial space, which avoids interference with other components and helps to form a compact overall structure.

As shown in FIGS. 2A-D, the turbine shell 2 includes a hub portion 201, a support portion 202 and a connecting portion 203 between them. The support portion 202 has an arc profile defining a fluid chamber, and the turbine blades are mounted on its concave side. The support portion 202 is connected to the inner edge of the annular flange portion 9 near the outer edge away from the rotational axis X. The turbine shell 2 can be integrally stamped to form the flange portion 9 of different structures, as shown in FIGS. 2A-D.

Figures 2A, 2B, 2C, 2D:
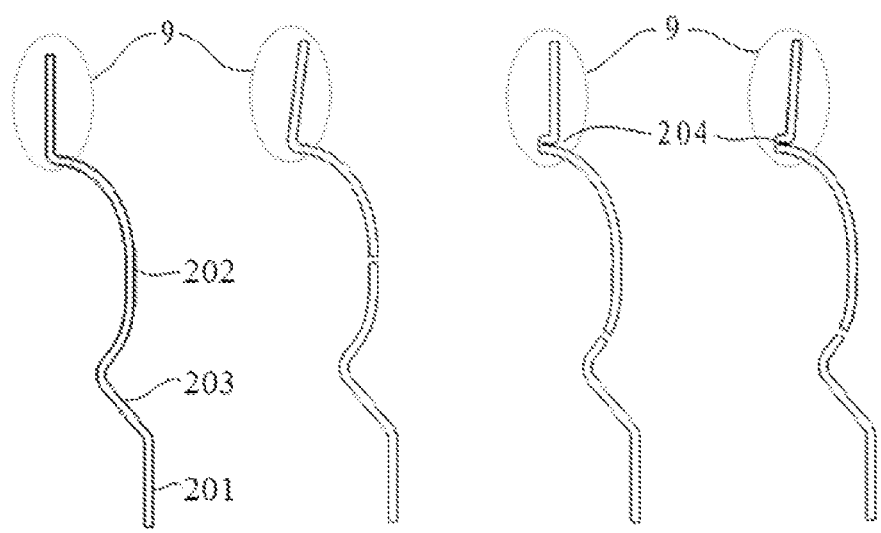
FIGS. 2A-2D are schematic views of the flange portion structure of the turbine shell according to different embodiments.

In FIGS. 2A and 2B, the flange portion 9 extends outward from the outer edge of the support portion 202. At this time, the inner edge of the flange portion 9 and the outer edge of the support portion 202 are directly connected. On the contrary, in FIGS. 2C and 2D, the flange portion 9 extends outward from a folded portion 204 located near the outer edge of the support portion 202. The folded portion 204 overlaps with a portion near the outer edge of the support portion 202 in the axial direction. The proximal end of the folded portion 204 (the end closer to the rotational axis X) is connected with the radial outer edge of the support portion 202, and the distal end of the folded portion 204 (the end farther away from the rotational axis X) is connected with the radial inner edge of the flange portion 9. The flange portion 9 in FIGS. 2C and 2D can be set to be offset away from the pump shell 1 (see FIG. 1) by a certain distance compared with the case without the folded portion. Therefore, the vibration damping device 8 on the flange portion 9 can be offset away from the pump shell 1, which allows the pump shell 1 to be disposed closer to the housing 6, thereby reducing the volume of the torque converter.

In FIGS. 2A and 2C, the flange portion 9 extends along a plane perpendicular to the rotational axis X. On the contrary, in FIGS. 2B and 2D, the flange portion 9 is inclined at a certain angle with respect to a plane perpendicular to the rotational axis X. Preferably, the inclination on the side away from the pump shell 1 is less than/equal to 5°. Compared with the case where there is no inclination angle, the vibration damping device 8 on the flange portion 9 in FIGS. 2B and 2D can be set to be inclined away from the pump shell 1, which allows the pump shell 1 to be disposed closer to the housing 6, thereby further reducing the volume of the torque converter.

Three specific embodiments of the present invention will be described below with reference to the accompanying drawings. It should be noted that the following embodiments are only used to present those skilled in the art with some feasible ways to implement the present invention. Those skilled in the art can make adjustments to these embodiments, which are all within the scope of protection of the present invention.

The First Embodiment

Figure 3A:
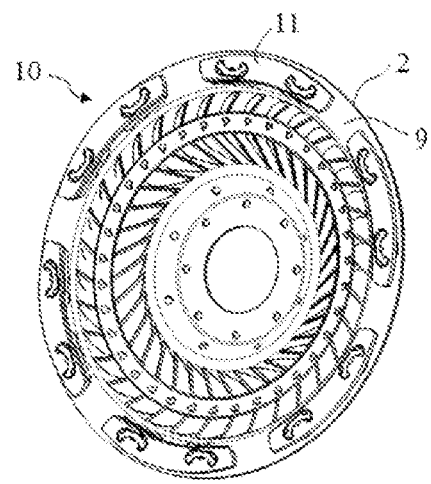
FIGS. 3A-3C are schematic views of the turbine shell of the torque converter according to the first embodiment.
Figure 3B:
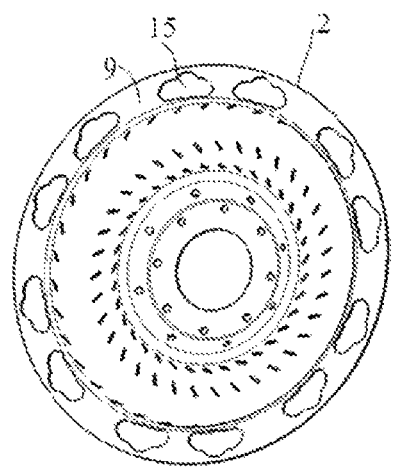
Figure 3C:
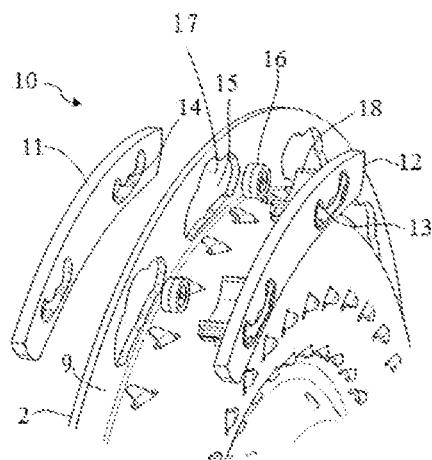

FIGS. 3A to 3C show the first embodiment, in which the vibration damping device 8 is a centrifugal pendulum 10 of the interference fit manner.

As shown in FIG. 3C, the centrifugal pendulum 10 includes a pair of masses 11 and 12 on either side of the flange portion 9 of the turbine shell 2, and the pair of masses 11 and 12 are fixedly coupled to each other by a boat-shaped spacer 13. Openings 14 are formed in each mass 11 and 12, and through holes 15 are formed in the flange portion 9. The boat-shaped spacer 13 passes through the through hole 15, and both ends of the boat-shaped spacer 13 are respectively fitted into the openings 14 of the masses 11 and 12 in an interference fit manner.

The radial outer edge of the spacer 13 defines a first track 18, and the radial outer edge of the through hole 15 of the turbine shell 2 defines a second track 17. A roller 16 is disposed between the first track 18 and the second track 17 and is able to swing along both of them in a circumferential stroke simultaneously.

In operation, when there is fluctuating torque on the turbine shell 2, the roller 16, the second track 17 and the first track 18 cooperate to make said pair of masses 11 and 12 swing relative to the turbine shell 2 under the effect of inertia, during which the masses 11 and 12 apply a fluctuating torque in the opposite direction to the turbine shell 2 via the roller 16, so as to at least partially offset the fluctuating torque on the turbine shell 2 and realize the vibration damping effect.

As shown in FIG. 3A, six pairs of masses are evenly arranged along the circumferential direction on the flange portion 9 of the turbine shell 2, wherein each pair of masses 11 and 12 are connected by two spacers 13. The structures of these two spacers 13 and the structures of the associated through holes 15 and rollers 16 are identical, and they are offset by a certain angle in the circumferential direction to facilitate the masses 11 and 12 to swing smoothly relative to the turbine shell 2.

As shown in FIG. 3B, twelve through holes 15 are formed in the flange portion 9 of the outer periphery of the turbine shell 2. In other embodiments, other numbers of through holes 15 may be provided in the flange portion 9 for mounting other numbers and arrangements of the masses 11 and 12.

The Second Embodiment

Figure 4A:
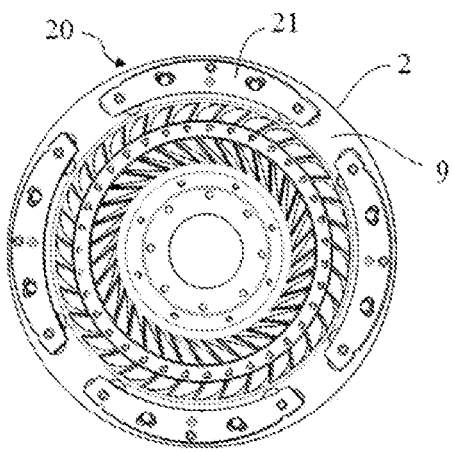
FIGS. 4A-4C are schematic views of the turbine shell of a torque converter according to a second embodiment.
Figure 4B:
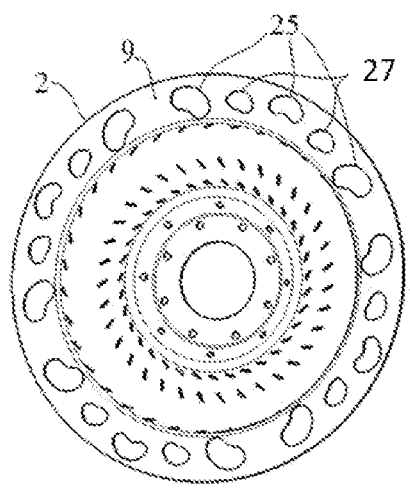
Figure 4C:
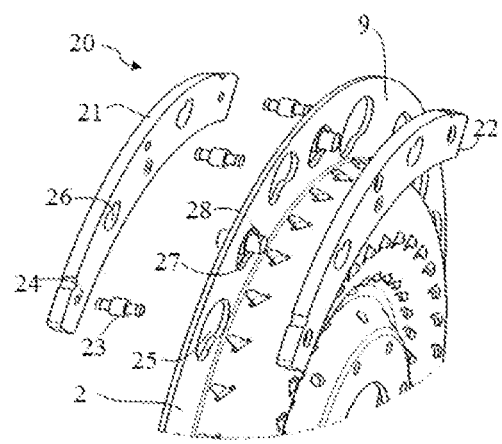

FIGS. 4A to 4C show the second embodiment, in which the vibration damping device 8 is a riveted centrifugal pendulum 20.

As shown in FIG. 4C, the centrifugal pendulum 20 includes a pair of masses 21 and 22 on either side of the flange portion 9 of the turbine shell 2, and the pair of masses 21 and 22 are fixedly coupled to each other by a rivet 23. Rivet mounting holes 24 are formed in each mass 21 and 22, and rivet guiding grooves 25 are formed in the flange portion 9. The rivet 23 passes through the rivet guiding grooves 25, and both ends of the rivet 23 are respectively fitted into the rivet mounting holes 24 of the masses 21 and 22 in an interference fit manner.

Outer waist-shaped holes 26 are also formed in each mass 21 and 22, and inner waist-shaped holes 27 are also formed in the flange portion 9. The outer waist-shaped holes 26 and the inner waist-shaped holes 27 have opposite orientations. In the illustrated embodiment, the outer waist-shaped holes 26 arch towards the radially inner side, while the inner waist-shaped holes 27 arch towards the radially outer side. A roller 28 is arranged passing through the outer waist-shaped holes 26 on the two sides and the inner waist-shaped hole 27 in the middle. The middle portion of the roller 18 engages the inner waist-shaped hole 27, and its two end portions respectively engage the corresponding outer waist-shaped holes 26. The inner waist-shaped hole 27 and the outer waist-shaped holes 26 so arranged allow the roller 28 to roll along the outer waist-shaped holes 27 and the inner waist-shaped hole 26 in a circumferential stroke simultaneously. In addition, as shown in FIG. 4B, each rivet guiding groove 25 also has a waist shape in order to prevent the rivet 23 from interfering with the rolling of the roller 28.

In operation, when there is a fluctuating torque on the turbine shell 2, the outer waist-shaped holes 26, the inner waist-shaped hole 27 and the roller 28 cooperate to make said pair of masses 21 and 22 swing relative to the turbine shell 2 under the effect of inertia, during which the masses 21 and 22 apply a fluctuating torque in the opposite direction to the turbine shell 2 via the roller 28, so as to at least partially offset the fluctuating torque on the turbine shell 2 and realize the vibration damping effect.

As shown in FIG. 4A, four pairs of masses are uniformly arranged in the circumferential direction along the flange portion 9 of the turbine shell 2, wherein each pair of masses 21 and 22 are coupled to each other by three rivets 23 and have two rollers 28, each roller 28 being arranged between two adjacent rivets 23. The two rollers 28 and their associated inner waist-shaped holes 26 and outer waist-shaped holes 27 are identical in structure, and they are offset by a certain angle in the circumferential direction to facilitate the masses 21 and 22 to swing smoothly relative to the turbine shell 2.

As shown in FIG. 4B, four groups of holes are formed on the flange portion 9 of the outer periphery of the turbine shell 2, each group of holes including three rivet guiding grooves 25 and two inner waist-shaped holes 26, and each inner waist-shaped hole 26 being located between two adjacent rivet guiding grooves 25. In other embodiments, other numbers and arrangements of the inner waist-shaped holes 26 and rivet guiding grooves 25 may be provided on the flange portion 9.

The Third Embodiment

Figure 5A:
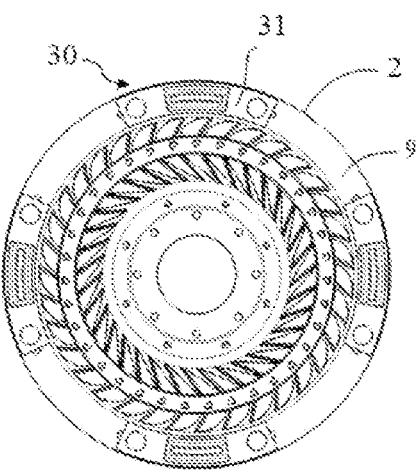
FIGS. 5A-5C are schematic views of the turbine shell of the torque converter according to the third embodiment.
Figure 5B:
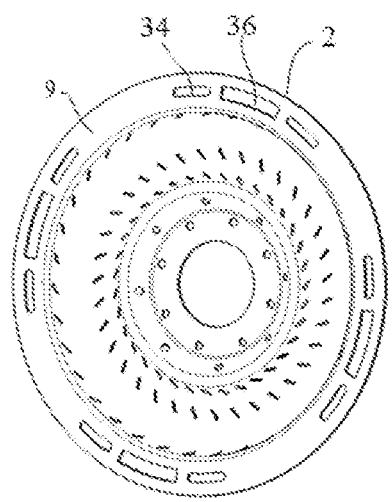
Figure 5C:
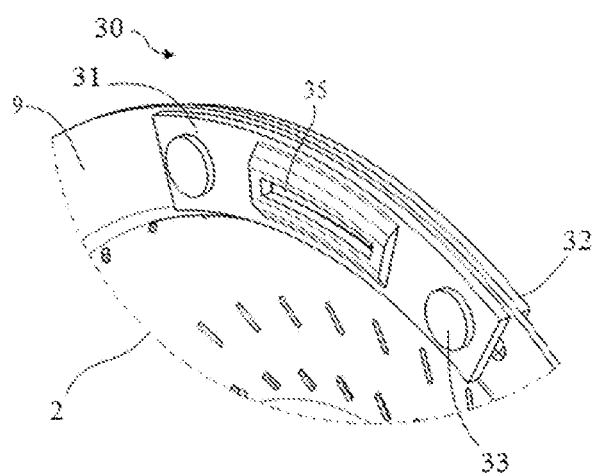

FIGS. 5A to 5C show the third embodiment, in which the vibration damping device 8 is a dynamic vibration absorber 30 with a spring.

As shown in FIG. 5C, the dynamic vibration absorber 30 includes a pair of masses 31 and 32 located on either side of the flange portion 9 of the turbine shell 2, and the pair of masses 31 and 32 are fixedly coupled to each other by a rivet 33. Rivet mounting holes are formed in each mass 31 and 32, and rivet guiding grooves 34 are formed in the flange portion 9. The rivet 33 passes through the rivet guiding grooves 34, and both ends of the rivets 33 are respectively riveted to the rivet mounting holes in the masses 31 and 32. The middle part of the rivet 33 can slide along the rivet guiding groove 34, so that the masses 31 and 32 coupled with the rivet 33 is able to swing in a circumferential stroke.

An outer spring groove 35 is also formed on each mass 31 and 32, and an inner spring groove 36 is also formed on the flange portion 9. The inner spring groove 36 and the outer spring groove 35 both extend along the circumferential direction and are aligned with each other, and they have the same circumferential length. A spring member (not shown), such as a spiral straight spring, is provided in the inner spring groove 36 and the outer spring groove 35. In the rest state, one end of the spring member simultaneously abuts against the first ends of the inner spring groove 36 and the outer spring groove 35, and the other end of the spring member simultaneously abuts against the opposite second ends of the inner spring groove 36 and the outer spring groove 35.

In operation, when there is a fluctuating torque on the turbine shell 2, the masses 31 and 32 swing relative to the turbine shell 2 under the effect of inertia, so that one end of the spring member is separated from the inner spring groove 36 on the turbine shell 2 and is only in contact with the ends of the outer spring grooves 35 of the masses 31 and 32; meanwhile, the opposite end of the spring member is separated from the outer spring grooves 35 of the masses 31 and 32 and is only in contact with the end of the inner spring groove 36 on the turbine shell 2. Thereby, the spring member is compressively deformed. During this period, the masses 31 and 32 apply a fluctuating torque in the opposite direction to the turbine shell 2 via the spring member, so as to at least partially offset the fluctuating torque on the turbine shell 2 and realize the vibration damping effect.

As shown in FIG. 5A, four pairs of masses are evenly arranged in the circumferential direction along the flange portion 9 of the turbine shell 2, wherein each pair of masses 31 and 32 are connected by two rivets 33 which are located on the circumferentially opposite sides of the spring member. The two rivets 33 and their associated rivet guiding grooves 34 are identical in structure, and they are offset by a certain angle in the circumferential direction to facilitate the masses 31 and 32 to swing smoothly relative to the turbine shell 2.

As shown in FIG. 5B, four groups of holes are formed on the flange portion 9 of the outer periphery of the turbine shell 2, each group of holes including two rivet guiding grooves 34 and an inner spring groove 36, and each inner spring groove 36 being located between the two rivet guiding grooves 34. In other embodiments, other numbers of inner spring grooves 36 and rivet guiding grooves 34 may be provided on the flange portion 9.

Actually, vehicles such as automobiles, engineering vehicles, agricultural vehicles and the like can include the torque converter as described above. Since the torque converter integrates a vibration damping device on the turbine shell, this vibration damping device can provide additional damping effect to eliminate the torque vibration generated by the internal combustion engine of the vehicle. This is beneficial to saving fuel consumption, reducing noise and improving vehicle reliability.

Some best embodiments and other embodiments for implementing the present invention have been described in detail above, but it should be understood that these embodiments only serve as examples and are not intended to limit the scope, applicability or configuration of the present invention in any way. The scope of protection of the present invention is defined by the appended claims and their equivalents. Those skilled in the art can make many changes to the aforementioned embodiments under the teaching of the present invention, and these changes all fall within the scope of protection of the present invention.

LIST OF REFERENCE NUMBERS 1 pump shell
2 turbine shell
3 guide wheel
4 spring damper
5 locking clutch
6 rear housing
7 pump shell hub
8 vibration damping device
9 flange portion
201 hub portion
202 support portion
203 connecting portion
204 folded portion
10 centrifugal pendulum
11 mass
12 mass
13 spacer
14 opening
15 through hole
16 roller
17 second track
18 first track
20 centrifugal pendulum
21 mass
22 mass
23 rivet
24 rivet mounting hole
25 rivet guiding groove
26 outer waist-shaped hole
27 inner waist-shaped hole
28 roller
30 dynamic vibration absorber
31 mass
32 mass
33 rivet
34 rivet guiding groove
35 inner spring groove
36 outer spring groove

What is claimed is:

1. A torque converter, including:
a pump shell having pump blades;
a turbine shell having a support portion supporting turbine blades, wherein the turbine blades are driven by the pump blades via a fluid to rotate about a rotational axis;
wherein the turbine shell further has a flange portion, the flange portion is located radially outside the support portion and extends outwardly, and the flange portion is integrally formed with the support portion;
wherein the torque converter further includes a vibration damping device, a mass of the vibration damping device is mounted on the flange portion and configured to be movable relative to the flange portion and apply a torque to the turbine shell; and
wherein a radial outer edge of the support portion is provided with a folded portion that attaches to the flange portion, and the folded portion overlaps axially with a portion of the support portion.

2. The torque converter according to claim 1, wherein the support portion and the flange portion are integrally formed via stamping.

3. A vehicle including the torque converter according to claim 2.

4. The torque converter according to claim 1, wherein the flange portion extends outwardly from the radial outer edge of the support portion.

5. A vehicle including the torque converter according to claim 4.

6. The torque converter according to claim 4,
wherein a proximal end of the folded portion is connected to the radial outer edge of the support portion, and a distal end of the folded portion is connected to a radial inner edge of the flange portion.

7. The torque converter according to claim 6, wherein the flange portion extends in a plane perpendicular to an axial direction.

8. The torque converter according to claim 6, wherein the flange portion is inclined at an angle with respect to a plane perpendicular to an axial direction.

9. A vehicle including the torque converter according to claim 6.

10. The torque converter according to claim 4, wherein the flange portion extends in a plane perpendicular to an axial direction.

11. A vehicle including the torque converter according to claim 10.

12. The torque converter according to claim 1,
wherein the mass is one of two masses included with the vibration damping device,
wherein the two masses are located on either side of the flange portion; and
wherein the two masses are fixed to each other by a connecting member, and the connecting member passes through a through hole in the flange portion and is movable along the through hole.

13. The torque converter according to claim 12,
wherein the connecting member is a boat-shaped spacer which mates with openings in the two masses in an interference fit manner;
wherein the spacer defines a first track, the through hole defines a second track radially facing the first track, and a roller is disposed between the first and second tracks; and
wherein the roller is configured to roll along both the first and second tracks and the two masses are capable of applying the torque onto the turbine shell via the roller.

14. The torque converter according to claim 12,
wherein each of the two masses include an outer waist-shaped hole, the flange portion has an inner waist-shaped hole, the outer waist-shaped holes and the inner waist-shaped hole are oriented in opposite radial directions, and a roller passes through the inner waist-shaped hole and the outer waist-shaped holes of the two masses; and
wherein the roller is configured to roll along the outer waist-shaped holes and the inner waist-shaped hole simultaneously and the two masses are capable of applying the torque onto the turbine shell via the roller.

15. The torque converter according to claim 12,
wherein each mass has an outer spring groove, the flange portion has an inner spring groove, the outer spring grooves and the inner spring groove have same circumferential lengths, and a spring member is disposed within the outer spring grooves and the inner spring groove; and
wherein the spring member is configured to contact only the outer spring grooves at one end and contact only the inner spring groove at the opposite end during compressively deforming, and the two masses are capable of applying the torque onto the turbine shell via the spring member.

16. A vehicle including the torque converter according to claim 1.

17. A torque converter, including:
a pump shell having pump blades;
a turbine shell having a support portion supporting turbine blades, wherein the turbine blades are driven by the pump blades via a fluid to rotate about a rotational axis;
wherein the turbine shell further has a flange portion, the flange portion is located radially outside the support portion and extends outwardly, and the flange portion is integrally formed with the support portion;
wherein the torque converter further includes a vibration damping device, a mass of the vibration damping device is mounted on the flange portion and configured to be movable relative to the flange portion and apply a torque to the turbine shell; and
wherein the flange portion is inclined at an angle with respect to a plane perpendicular to an axial direction.

18. The torque converter according to claim 17, wherein the flange portion is inclined in a direction away from the pump shell.

19. A vehicle including the torque converter according to claim 18.

20. A vehicle including the torque converter according to claim 17.

* * * * *